United States Patent

Davies

[15] 3,651,410

[45] Mar. 21, 1972

[54] ADDING FREQUENCY-MODULATED ELECTRICAL SIGNALS

[72] Inventor: Robin Evan Davies, Horley, England

[73] Assignees: The Marconi Company Limited; Standard Telephones & Cables Limited, London, England

[22] Filed: Oct. 8, 1969

[21] Appl. No.: 864,735

[30] Foreign Application Priority Data

Oct. 10, 1968 Great Britain......................48,149/68

[52] U.S. Cl...............................325/446, 178/6.8, 329/133, 329/163, 332/18, 328/133, 328/158

[51] Int. Cl...........................................................H04b 1/26

[58] Field of Search............................325/45, 47, 145–148, 325/344, 345, 347, 349, 351, 435, 430, 442, 445, 446, 451; 332/18, 22, 23, 24, 21; 329/131, 133, 134, 163, 164–166; 178/5.4 C, DIG. 24, 6.8; 179/15 ST; 307/295; 328/133, 156, 158

[56] References Cited

UNITED STATES PATENTS

| | | | |
|---|---|---|---|
| 2,278,690 | 4/1942 | Clarke | 332/23 A |
| 3,210,667 | 10/1965 | Hern et al. | 325/347 |
| 3,513,398 | 5/1970 | Bossard et al. | 325/446 |
| 3,514,719 | 5/1970 | Rhodes | 332/23 |
| 2,700,103 | 1/1955 | Selove | 328/133 |
| 3,010,069 | 11/1961 | Mills et al. | 328/158 |

*Primary Examiner*—Robert L. Griffin
*Assistant Examiner*—Albert J. Mayer
*Attorney*—Kemon, Palmer & Estabrook

[57] ABSTRACT

Apparatus for generating an output signal the frequency of which is equal to the sum of the frequencies of two frequency-modulated input signals without demodulating the input signals is used in averaging two frequency-modulated signals and consists of a balanced mixer, and a band-pass filter and an amplitude limiter connected in series to the output of the mixer. The mixer consists of two transformers, two full-wave rectifiers and a differential amplifier connected to generate from two input signals A and B a signal A+B—A—B.

7 Claims, 2 Drawing Figures

Figure 1:
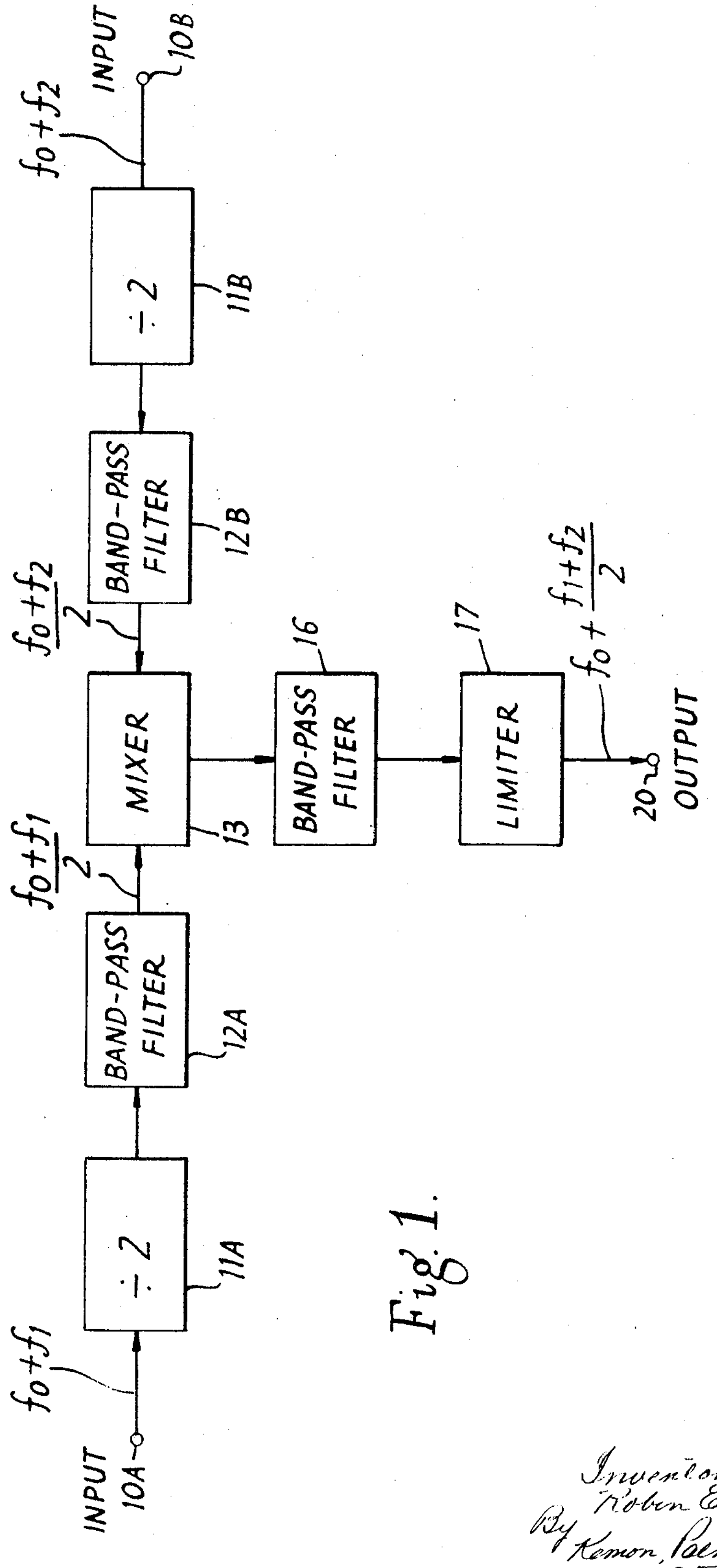

Inventor:
Robin Evan Davies
By Kemon, Palmer & Estabrook
Attorneys

Inventor:
Robin Evan Davies
By Kemon, Palmer & Estabrook

ADDING FREQUENCY-MODULATED ELECTRICAL SIGNALS

This invention relates to apparatus for mixing frequency-modulated electrical signals.

In television standards converters, such as are described in British Pat. Nos. 1,052,438 and 1,068,101, and in corresponding U.S. Pat. Nos. 3,400,211 and 3,457,369, television signals are transmitted through ultrasonic delays using frequency modulations. As described in British Pat. application No. 46246/67, now British Pat. No. 1,191,500, it is sometimes desired to average two of these frequency-modulated signals. Since the resultant signal is itself sometimes passed through further ultrasonic delays or may even be recirculated, it is desirable that the averaging takes place without demodulation of the frequency-modulated signals.

The averaging process comprises two stages which may take place in either order. One stage is the mixing of two input signals to provide an output signal the instantaneous frequency of which is equal to the sum of the instantaneous frequencies of the two input signals. The other stage is the dividing by two of the frequency of either both of the input signals or else of the output signal.

It is desirable in a television standards converter that the averaging process should take place with great accuracy, i.e., without the introduction of spurious signals. It is important therefore that the stage of mixing two frequency-modulated signals should be achieved without the intoduction of unwanted signals.

If an ideal square-law mixer is used to effect the mixing, only signals having frequencies equal to the sum and difference of the input signals are generated. It is possible to separate these signals of widely differing frequencies by using a band-pass filter. However, commonly-available devices generate harmonics of the input signals. In particular the harmonics having twice the frequency of the input signals have frequencies which are very close to the desired signal (the frequency of which is equal to the sum of the input frequencies), and it is not possible to separate these with a band-pass filter.

An object of this invention is to provide apparatus for generating an output signal the frequency of which is equal to the sum of the frequencies of two frequency-modulated input signals without demodulating the input signals.

Another object of the invention is to provide a balanced mixer which is of relatively simple construction.

A further object of the invention is to provide apparatus for mixing frequency-modulated signals without the introduction of spurious signals.

This invention provides in one aspect apparatus for generating from two frequency-modulated input signals of the same amplitude an output signal the frequency of which is equal to the sum of the frequencies of the input signals. The apparatus comprises a balanced mixer and a band-pass filter and a limiter connected to the output of the mixer to remove amplitude modulation of the output signal. This aspect of the invention is based on my discovery that if the mixer is accurately balanced and the two input signals are of equal amplitude, the unwanted terms generated by virtue of the mixer not being an ideal square-law mixer result in amplitude modulation only of the sum frequency and are thus removed by the limiter.

A second aspect of the invention which may be used either independently or in combination with the first aspect provides a balanced mixer which generates from two input signals A and B an output signal $|A+B|-|A-B|$. The mixer comprises means for generating two signals A+B and A−B, two full wave rectifiers for generating $|A+B|$ and $|A-B|$ and means for subtracting these last two signals to provide $|A+B|-|A-B|$.

Figure 2:
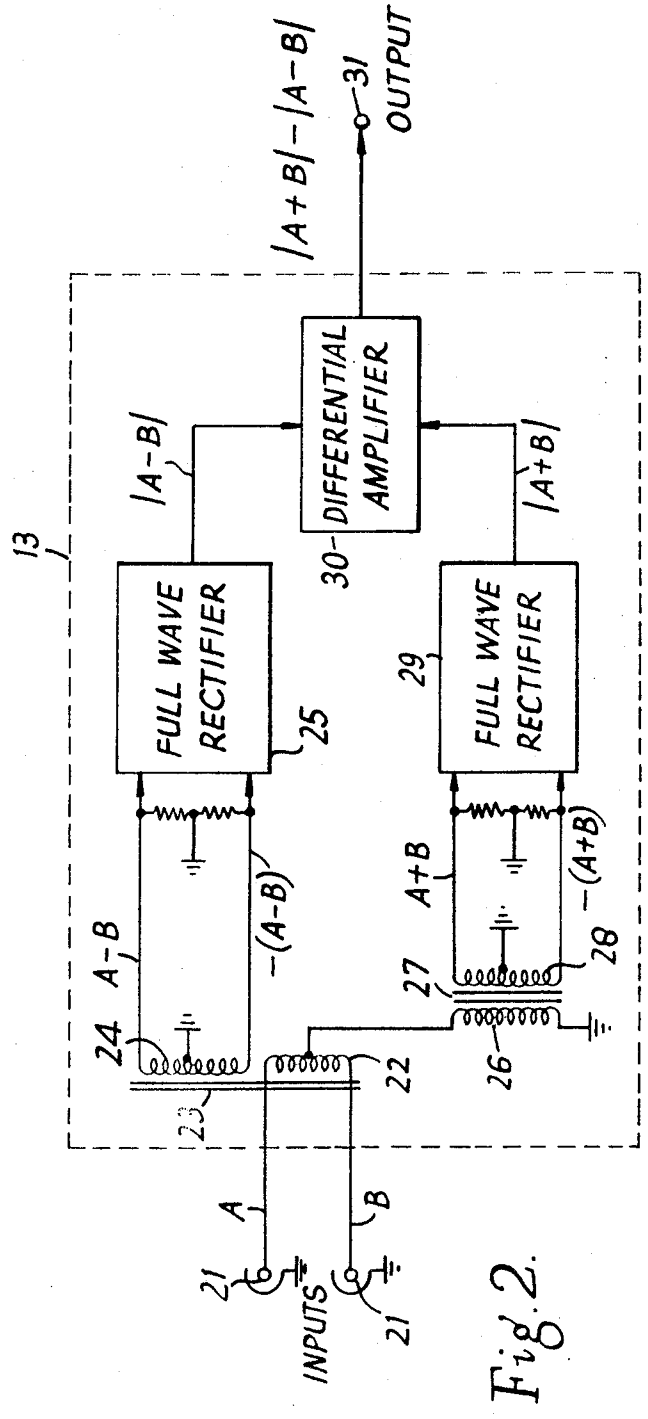

The invention will now be described in more detail by way of example, with reference to the accompanying drawings, in which:

FIG. 1 is a block circuit diagram of an averaging circuit embodying the invention, and FIG. 2 is a circuit diagram of the mixer 13 shown in FIG. 1.

The averaging circuit of FIG. 1 has two inputs 10A and 10B for receiving two television signals frequency-modulated onto the same carrier. The signal at input 10A has a frequency $f_o+f_1$ and the signal at input 10B has a frequency $f_o+f_2$ where $f_o$ is the carrier frequency, and $f_1$ and $f_2$ are modulating frequencies.

The two inputs 10A and 10B are each connected to a divide-by-two circuit 11A and 11B respectively which divides the frequency of the input signals by two, thus retaining the modulation by halving the frequency deviation and the nominal carrier frequency. By virtue of limiters in the circuits 11A and 11B, the amplitude of the output signals from the divide-by-two circuits 11A and 11B are maintained constant and equal and are independent of the amplitudes of the input signals (provided the latter are within a given operating range). Two band-pass filters 12A and 12B are connected respectively to the outputs of the divide-by-two circuits 11A and 11B to remove unwanted harmonics generated by the circuits 11A and 11B.

The outputs of the filters 12A and 12B are thus signals having frequencies $\frac{1}{2}(f_o+f_1)$ and $\frac{1}{2}(f_o+f_2)$ respectively. These two signals are applied to a balanced mixer 13 which generates a signal the frequency of which is equal to the sum of the two input frequencies, namely $\frac{1}{2}(f_o+f_1)+\frac{1}{2}(f_o+f_2)$.

However the mixer 13 also generates certain undesired signals and these are removed by a band-pass filter 16 and an amplitude limiter 17 connected in series to the output of the mixer 13. The output of the limiter 17 is connected to an output terminal 20. The band-pass filter removes in particular the difference frequency $\frac{1}{2}(f_1-f_2)$.

I have discovered that provided that the mixer 13 is accurately balanced, and the signals applied to the inputs of the mixer have equal amplitude, the unwanted harmonics of the input frequencies which have frequencies near the sum frequency $f_o+\frac{1}{2}(f_1+f_2)$ and are therefore passed by the band-pass filter 16 occur only as amplitude modulation of the sum frequency, and are thus removed by the limiter 17.

The accurately-balanced mixer 13 is shown in more detail in FIG. 2. The mixer 13 has two input terminals 21 for connection to the outputs of the filters 12A and 12B via coaxial lines. The input terminals 21 are connected across the primary winding 22 of a transformer 23. A center-tapped secondary winding 24 is connected through coaxial lines and matching impedances to a full-wave rectifier 25.

The primary winding 22 of the transformer 23 is also center-tapped, and the tapping is connected to the primary winding 26 of a transformer 27. The secondary winding 28 of the transformer 27 is also connected through coaxial lines and matching impedances to a second full-wave rectifier 29. The outputs of the full-wave rectifiers 25 and 29 are connected to a differential amplifier 30 which is connected to an output 31.

If the signals applied to the two inputs 21 are termed A and B respectively, the signal at the secondary 24 of the transformer 23 will be proportional to A−B. The signal at the secondary 28 of the transformer 27 will be proportional to A+B. Thus the signals at the outputs of the rectifiers 25 and 29 are $|A-B|$ and $|A+B|$ respectively, and the signal at the output 31 is therefore the difference between these two signals, namely, $|A+B|-|A-B|$.

The frequencies in this output signal are equal to the sum and difference frequencies formed from the frequencies of the two signals A and B, and also the circuit is accurately balanced with respect to A and B.

This may be seen by taking the input signals A and B as:

$$A=\cos(w_1+w_2)t$$

and $$B=\cos(w_1-w_2)t$$

These are related to $f_o$, $f_1$, and $f_2$ by $$(f_o+f_1)/2=(w_1+w_2)/2\pi$$

and $$(f_o+f_2)/2=(w_1-w_2)/2\pi$$

from which the wanted output frequency $f_o+\frac{1}{2}(f_1+f_2)=2w_1/2\pi$

Now, from the above definitions of A and B, $$|A+B|=|\cos(w_1+w_2)t+\cos(w_1-w_2)t|$$
$$=|2\cos w_1t\cdot\cos w_2t|$$

$$=2\,|\cos w_1t|\cdot|\cos w_2t|$$

The term $|\cos w_1t|$ can be expanded as a Fourier series containing only cosine terms, since it is symmetrical about $t=0$, and containing only even multiples of $w_1$ because half-cycles of $\cos w_1t$ become identical when the modulus is taken, and consequently the frequency of $|\cos w_1t|$ is twice that of $\cos w_1t$. Thus:

$$|A+B|=2\,|\cos w_2t|\cdot[a_0+a_1\cos 2w_1t+a_2\cos 4w_1t+\ldots]$$

Similarly:

$$|A-B|=2\,|\sin w_2t|\cdot[a_o-a_1\cos 2w_1t+a_2\cos 4w_1t-\ldots]$$

Hence:

$$\begin{aligned}|A+B|-|A-B| &= 2a_o[\,|\cos w_2t|-|\sin w_2t|\,]\\ &\quad+2a_1\cos 2w_1t\,[\,|\cos w_2t|+|\sin w_2t|\,]\\ &\quad+2a_2\cos 4w_1t\,[\,|\cos w_2t|-|\sin w_2t|\,]\\ &\quad+\ldots\end{aligned}$$

Considering this series, the first term represents a low frequency variation which is not passed by the band-pass filter 16. The second term represents a signal at a frequency $2w_1/2\pi$ which is amplitude modulated to a depth of approximately 15 percent. The remaining terms are at higher frequencies of the order of integral multiples of the desired frequency. Thus the wanted term $\cos 2w_1t$ is easily separated from the remaining terms by the band-pass filter 16. The limiter 17 then removes the amplitude modulation leaving only a signal having the frequency $2w_1/2\pi=f_0+\tfrac{1}{2}(f_1+f_2)$.

I claim:

1. A balanced mixer comprising:

two inputs for receiving respect input signals A and B;

a transformer having a center-tapped primary winding and a center-tapped secondary winding, each end of said primary winding being connected to a respective one of said inputs;

a first full-wave rectifier coupled to said center-tap on said primary winding;

a second full-wave rectifier coupled to the ends of said secondary winding; and means connected to said rectifiers to form an output signal proportional to the instantaneous difference between the two rectified signals and of the form $|A+B|-|A-B|$.

2. A mixer as claimed in claim 1, wherein said center-tap of said primary winding is connected to the primary winding of a second transformer having a center-tapped secondary winding the ends of which are each connected to a corresponding one of said rectifiers.

3. A mixer as claimed in claim 1, further comprising a band-pass filter connected to the output of said last-mentioned means.

4. A mixer as claimed in claim 1, further comprising a limiter connected to the output of said last-mentioned means.

5. Apparatus for generating from two frequency-modulated input signals of the same amplitude an output signal the frequency of which is equal to the sum of frequencies of said input signals; said apparatus comprising:

a first input terminal to receive a first one A of said input signals;

a second input terminal to receive a second one B of said input signals;

a balanced mixer connected to said first and second input terminals to receive said first and second input signals A and B and having an output, said mixer comprising:

a transformer having a center-tapped primary winding and a center-tapped secondary winding, said primary winding being coupled to said first and second input terminals to receive one of said input signals at each of its ends respectively;

two full-wave rectifiers coupled respectively to said center-tap on said primary winding and to the ends of said secondary winding; and means connected to said rectifiers to form and output signal proportional to the instantaneous difference between the two rectified signals; said output signal being of the form $|A+B|-|A-B|$; and a band-pass filter and a limiter coupled in series to said output of said mixer to remove amplitude modulation of said output signal.

6. Apparatus as claimed in claim 5, further comprising means connected between said input terminals respectively and said balanced mixer to render the amplitudes of said two input signals equal.

7. A mixer as claimed in claim 5, wherein said center-tap of said primary winding is connected to the primary winding of a second transformer, the secondary winding of which is center-tapped and has its ends connected to the corresponding one of said rectifiers.

* * * * *